United States Patent
Asmar

(10) Patent No.: US 11,618,414 B2
(45) Date of Patent: Apr. 4, 2023

(54) METHOD OF VEHICLE THEFT DETECTION

(71) Applicant: GM Global Technology Operations LLC, Detroit, MI (US)

(72) Inventor: Ron Y. Asmar, West Bloomfield, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 274 days.

(21) Appl. No.: 17/036,901

(22) Filed: Sep. 29, 2020

(65) Prior Publication Data

US 2022/0097652 A1     Mar. 31, 2022

(51) Int. Cl.
| | |
|---|---|
| *B60R 25/00* | (2013.01) |
| *B60R 25/30* | (2013.01) |
| *B60R 25/22* | (2013.01) |
| *B60R 25/10* | (2013.01) |
| *B60R 25/04* | (2013.01) |

(52) U.S. Cl.
CPC ............ *B60R 25/305* (2013.01); *B60R 25/04* (2013.01); *B60R 25/10* (2013.01); *B60R 25/22* (2013.01)

(58) Field of Classification Search
CPC ......... B60R 25/00; B60R 25/04; B60R 25/08; B60R 25/10; B60R 25/102; B60R 25/22; B60R 25/24; B60R 25/30; B60R 25/302; B60R 25/305; B60R 25/31; G06F 19/00
See application file for complete search history.

(56) References Cited

U.S. PATENT DOCUMENTS

| | | | |
|---|---|---|---|
| 7,323,970 B1 * | 1/2008 | Murray | H04W 52/0251 701/2 |
| 2012/0046807 A1 * | 2/2012 | Ruther | B60R 25/24 701/2 |
| 2012/0286950 A1 * | 11/2012 | Peariso | G08B 13/1427 340/539.1 |

FOREIGN PATENT DOCUMENTS

KR     20110125791     * 11/2011

OTHER PUBLICATIONS

NPL Search.*

* cited by examiner

*Primary Examiner* — Van T Trieu
(74) *Attorney, Agent, or Firm* — Vivacqua Crane PLLC

(57) ABSTRACT

A method and system of theft detection for a vehicle are provided. The method comprises providing a telematics module, a body control module and an engine control module disposed in the vehicle having components and at least one theft-detected state. The body control module is in communication with the telematics module and the engine control module. The telematics module is in further communication with a backend server disposed remotely from the vehicle. The method further comprises detecting at least one event by the body control module defining a theft flag. The method further comprises detecting disablement of the telematics module from one of the body control module and the backend server. The method further comprises activating the at least one theft-detected state of the vehicle when the theft flag and disablement of the telematics module are detected.

18 Claims, 2 Drawing Sheets

METHOD OF VEHICLE THEFT DETECTION

INTRODUCTION

The present disclosure relates to detection systems and, more particularly, methods and systems of theft detection for a vehicle.

Theft detection systems and methods are important in vehicles. An issue in theft detection is a telematics module may be disabled via disconnecting or wireless jamming to prevent vehicle tracking during a vehicle theft. Although current systems and methods may be acceptable, improvement can be made.

SUMMARY

Thus, while current systems and methods may achieve their intended purposes, there is a need for a new and improved method and system for vehicle theft detection.

According to one aspect of the disclosure, a method of theft detection for a vehicle is provided. The method comprises providing a telematics module, a body control module and an engine control module disposed in the vehicle having components and at least one theft-detected state. The body control module is in communication with the telematics module and the engine control module. Moreover, the telematics module is in further communication with a backend server. Furthermore, the backend server is disposed remotely from the vehicle.

In this aspect, the method further comprises detecting at least one event by the body control module defining a potential theft flag and detecting disablement of the telematics module from one of the body control module and the backend server. Furthermore, the method comprises activating the at least one theft-detected state of the vehicle when the theft flag and disablement of the telematics module are detected.

In one example of this aspect, the at least one theft-detected states comprises inhibited propulsion of the vehicle, inhibited key learning in the body control module, inhibited transmission of the vehicle, initiated video recording of driver position, initiated vehicle slow down, initiated at least one vehicle component lockdown, and initiated vehicle display.

In another example of this aspect, the step of detecting the at least one event by the body control module includes detecting one of a new key learned, a vehicle alarm trigger, loss of communication with the engine control module, and no key found when driving.

In yet another example, the components include a navigation system, a stereo system, a heating system, an air conditioning system of the vehicle.

In still another example, the step of detecting disablement of the telematics module includes detecting loss of communication between the telematics module and one of the body control module and the backend server.

In another example, the method further comprises detecting enablement of the telematics module from the one of the body control module and the backend server and deactivating the at least one theft-detected state of the vehicle when enablement of the telematics module is detected or reactivating the inhibited functions.

In another aspect of the present disclosure, a method of theft detection for a vehicle is provided. The method comprises providing a telematics module, a body control module and an engine control module disposed in the vehicle having components and at least one theft-detected state. The body control module is in communication with the telematics module and the engine control module. Moreover, the telematics module is in further communication with a backend server, the backend server being disposed remotely from the vehicle. In this example, the method further comprises detecting at least one event by the body control module defining a theft flag. Additionally, the method comprises detecting loss of communication between the telematics module and one of the body control module and the backend server. Furthermore, the method comprises activating the at least one theft-detected state of the vehicle when the theft flag and disablement/loss of communication of the telematics module are detected.

In one example of this aspect, the at least one theft-detected states comprises inhibited propulsion of the vehicle, inhibited key learning in the body control module, inhibited transmission of the vehicle, initiated video recording of driver position, initiated vehicle slow down, initiated at least one vehicle component lockdown, and initiated vehicle display.

In another example, the step of detecting the at least one event by the body control module includes detecting one of a new key learned, a vehicle alarm trigger, loss of communication with the engine control module, and no key found when the vehicle is in operation.

In yet another example, the components include a navigation system, a stereo system, a heating system, an air conditioning system.

In still another example, the step of detecting loss of communication between the telematics module and one of the body control module and the backend server includes loss of data transmission.

In another example of this aspect, the method further comprises detecting enablement of the telematics module from the one of the body control module and the backend server and deactivating the at least one theft-detected state of the vehicle when enablement of the telematics module is detected.

In another aspect of the present disclosure, a system of theft detection for a vehicle is provided. The system comprises an engine control module disposed in the vehicle for engine control and a telematics module disposed in the vehicle for transmittal of vehicle data. The system further comprises a body control module disposed in the vehicle having electronic components and at least one theft-detected state and in communication with the engine control module and the telematics module. The body control module is programmed to detect at least one event defining a theft flag and to detect disablement of the telematics module. Furthermore, the system comprises a backend serve remotely located from the vehicle. The backend server is in communication with the telematics module and the body control module. The backend server is programmed to detect disablement of the telematics module. In this aspect, one of the body control module and the backend server is programmed to activate the at least one theft-detected state of the vehicle when the theft flag and disablement of the telematics module are detected.

The telematics module may be programmed to detect disablement with the backend server and communicate the disablement to the body control module for determination of vehicle theft detected state. In this aspect, one of the body control module and other vehicle electronic modules may be programmed to activate at least one theft-detected state of the vehicle when the theft flag and disablement of the telematics module are detected.

In one example of this aspect, the at least one theft-detected states comprises inhibited propulsion of the vehicle, inhibited key learning in the body control module, inhibited transmission of the vehicle, initiated video recording of driver position, initiated vehicle slow down, initiated at least one vehicle component lockdown, and initiated vehicle display.

In another example, the at least one event by the body control module includes detecting one of a new key learned, a vehicle alarm trigger, loss of communication with the engine control module, and no key found when driving.

In yet another example, the components include a navigation system, a stereo system, a heating system, and an air conditioning system of the vehicle.

In still another example of this aspect, disablement of the telematics module includes loss of communication between the telematics module and one of the body control module and the backend server.

In another example, the method further comprises detecting enablement of the telematics module from the one of the body control module and the backend server and deactivating the at least one theft-detected state of the vehicle when enablement of the telematics module is detected.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
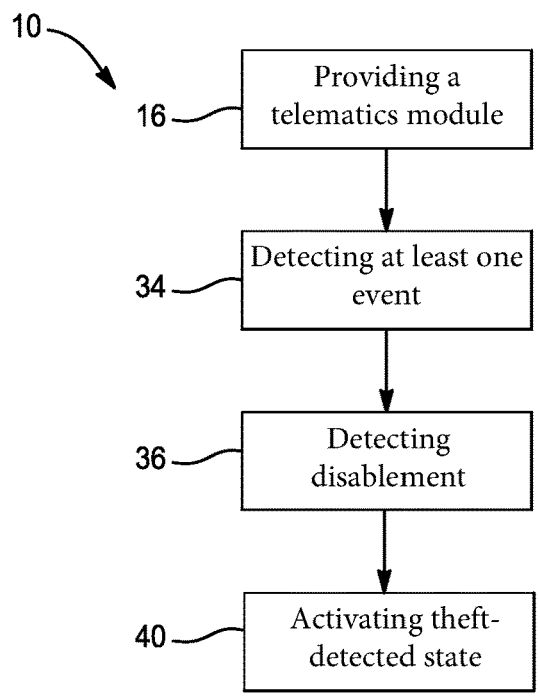
FIG. 1 is a flowchart of a method of theft detection for a vehicle in accordance with one aspect of the present disclosure.
Figure 2:
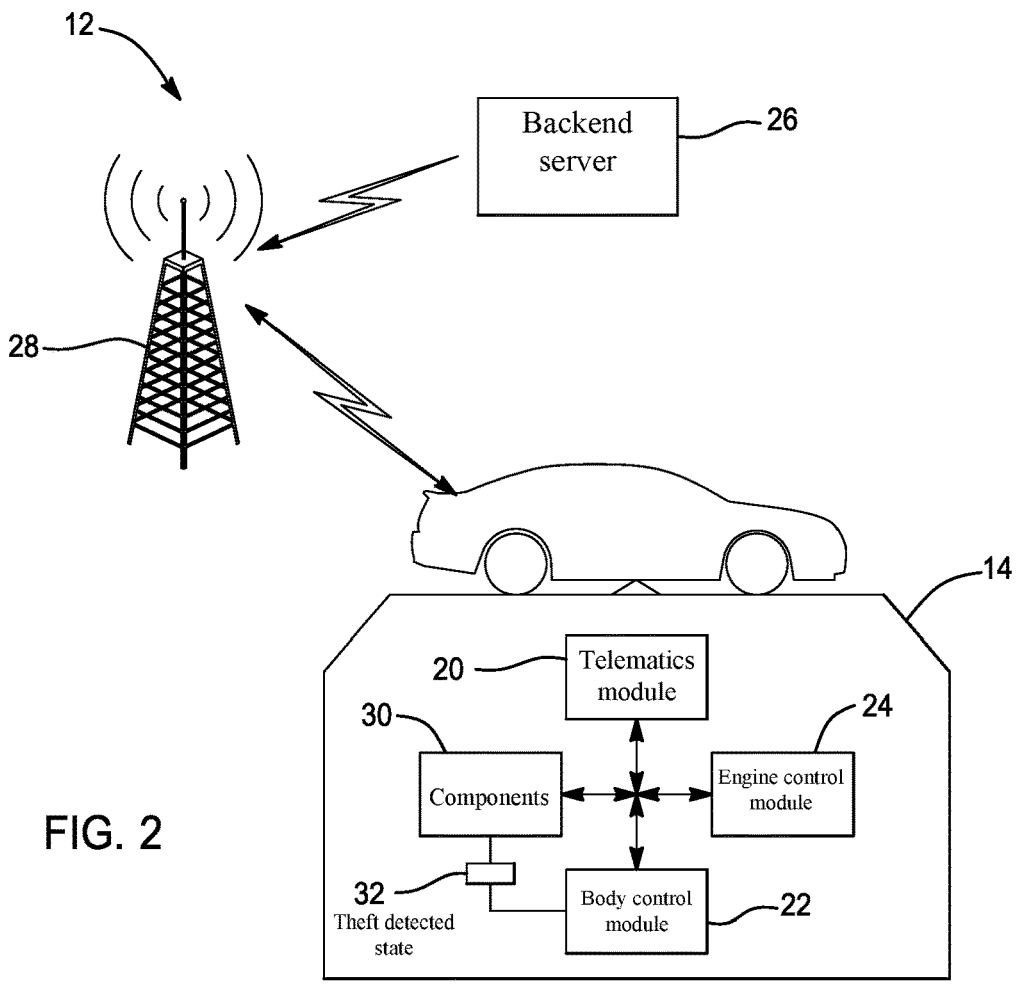
FIG. 2 is a schematic view of a system for theft detection for a vehicle in accordance with the method of FIG. 1.

FIGS. 1 and 2 depict a method 10 and system 12 of theft detection for a vehicle 14 in accordance with one aspect of the present disclosure. As shown, the method 10 of theft detection for the vehicle 14 comprises a step 16 of providing a telematics module 20, a body control module 22 and an engine control module 24 disposed in the vehicle 14. In this example, the vehicle 14 has components 30 and the body control module 22 has at least one theft-detected state 32 as discussed in greater detail below.

For example, the vehicle components 30 may include a navigation system, a vehicle alarm system, a camera and recording system, a stereo system, a heating system, a vehicle display system, and an air conditioning system of the vehicle. It is to be understood that the components 30 may include other systems without departing from the spirit or scope of the present disclosure. Moreover, the at least one theft-detected state 32 in the body control module 22 may include an inhibited propulsion state of the vehicle, an inhibited key learning state in the body control module, an inhibited transmission state of the vehicle, an initiated video recording state of driver position, an initiated vehicle slow down state, an initiated vehicle component lockdown state, an initiated vehicle display state, and an initiated vehicle alarm state. Other theft-detected states may be included without departing from the spirit or scope of the present disclosure.

In this example, the body control module 22 is in communication with the telematics module 20, the vehicle components 30, and the engine control module 24. Moreover, the telematics module 22 is in further communication with a backend server 26. Preferably, the backend server 26 is disposed remotely from the vehicle 14 and may be in direct communication with the telematics module 20 or by way of a cellular tower 28.

As shown in FIG. 1, the method 10 further comprises the body control module 22 detecting at least one event in box 34, defining a theft flag. In the body control module 22, the at least one event may include detecting one of a new key learned, a vehicle alarm trigger, a loss of communication with the engine control module, and a no key found event when driving. It is to be understood that other events may be included without departing from the spirit or scope of the present invention.

As depicted in FIG. 1, the method 10 further comprises a step 36 of detecting disablement of the telematics module 20 from one of the body control module 22 and the backend server 26. The step 36 of detecting disablement of the telematics module 20 includes sensing a loss of communication between either the telematics module 20 and the body control module 22 or between the telematics module 20 and the backend server 26. For example, the body control module 22 may monitor periodic serial data from the telematics module 20. If the body control module 22 detects that the serial data is not present or is no longer being received, the body control module 22 will determine a loss of communication with the telematics module 20 in the vehicle 14.

In another example, the telematics module 20 may receive periodic state-of-health messages via cellular signals from the backend server 26. That is, the telematics module 20 may receive state-of-health messages from the backend server 26 once every 15 minutes. If the telematics module 20 does not receive a state-of-health message from the backend server 26, the telematics module 20 sends a signal to the body control module 22 to report that loss of communication with the backend server 26 has occurred.

As shown in FIG. 1, the method 10 comprises a step 40 of activating the at least one theft-detected state of the vehicle when the theft flag and disablement of the telematics module are detected. For example, when the theft flag and disablement of the telematics module 20 are detected, the body control module 22 may initiate the camera to record the driver position, inhibit propulsion of the vehicle, and activate the vehicle alarm system. When the theft flag and disablement of the telematics module 20 are detected, it is to be understood that the body control module 22 may activate any theft-detected state without departing from the spirit or scope of the present disclosure.

Figure 3:
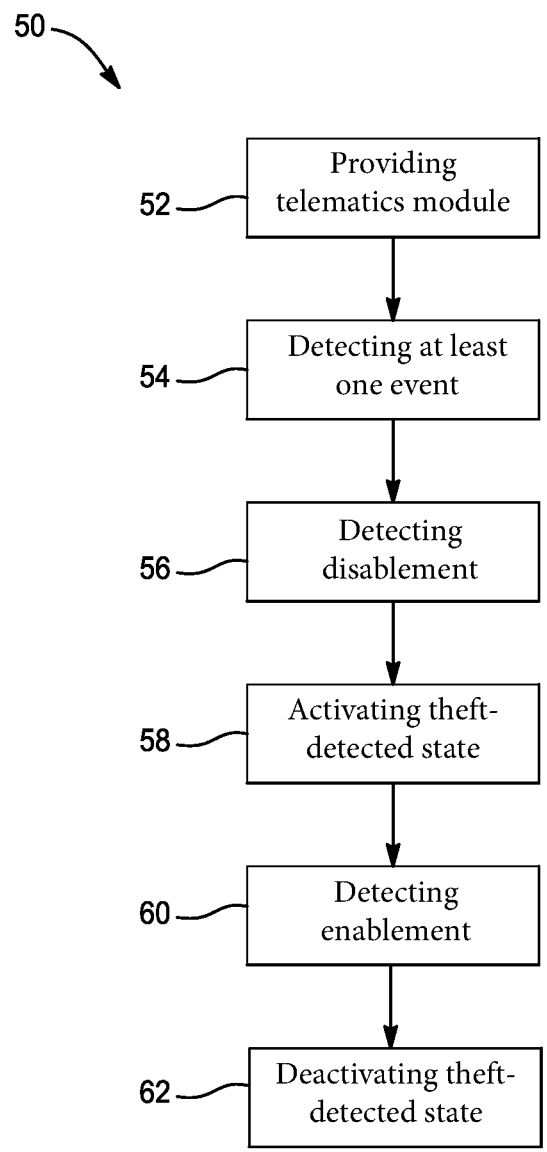
FIG. 3 is a flowchart of a method of theft detection for a vehicle in accordance with another aspect of the present disclosure.

FIG. 3 depicts another method 50 of theft detection for a vehicle 14 (using the system shown in FIG. 2) in accordance with another aspect of the present disclosure. As shown, the method 50 of theft detection for the vehicle 14 comprises providing a telematics module, a body control module and an engine control module disposed in the vehicle in box 52. As mentioned above, the vehicle has components 30 and at least one theft-detected state as discussed in greater detail below.

For example, the vehicle components 30 may include a navigation system, a vehicle alarm system, a camera and recording system, a stereo system, a heating system, a vehicle display system, and an air conditioning system of the vehicle. It is to be understood that the components 30 may include other systems without departing from the spirit or scope of the present disclosure. As also described above, the at least one theft-detected state in the body control module 22 may include an inhibited propulsion state of the vehicle, an inhibited key learning state in the body control module 22, an inhibited transmission state of the vehicle, an initiated video recording state of driver position, an initiated vehicle slow down state, an initiated vehicle component lockdown state, an initiated vehicle display state, and an initiated vehicle alarm state. Other theft-detected states may be included without departing from the spirit or scope of the present disclosure.

As in this example, the body control module 22 is in communication with the telematics module 20, the vehicle components 30, and the engine control module 24. Moreover, the telematics module 20 is in further communication with a backend server 26. Preferably, the backend server 26 is disposed remotely from the vehicle 14 and may be in direct communication with the telematics module 20 or by way of a cellular tower 28.

As shown in FIG. 3, the method 50 further comprises the body control module 22 detecting at least one event in box 54 defining a theft flag. In the body control module 22, the at least one event may include detecting one of a new key learned, a vehicle alarm trigger, a loss of communication with the engine control module, and a no key found event when driving. It is to be understood that other events may be included without departing from the spirit or scope of the present invention.

As depicted in FIG. 3, the method 50 further comprises detecting disablement of the telematics module 20 from one of the body control module 22 and the backend server 26 in box 56. The step 56 of detecting disablement of the telematics module 20 includes sensing a loss of communication between either the telematics module 20 and the body control module 22 or between the telematics module 20 and the backend server 26. For example, the body control module 22 may monitor periodic serial data from the telematics module 20. If the body control module 22 detects that the serial data is not present or is no longer being received, the body control module 22 will determine a loss of communication with the telematics module 20 in the vehicle 14.

In another example, the telematics module 20 may receive periodic state-of-health messages via cellular signals from the backend server 26. That is, the telematics module 20 may receive state-of-health messages from the backend server 26 once every 15 minutes. If the telematics module 20 does not receive a state-of-health message from the backend server 26, the telematics module 20 sends a signal to the body control module 22 to report that loss of communication with the backend server 26 has occurred.

As shown in FIG. 3, the method 50 comprises activating the at least one theft-detected state of the vehicle in box 58 when the theft flag and disablement of the telematics module 30 are detected. For example, when the theft flag and disablement of the telematics module 20 are detected, the body control module 22 may initiate the camera to record the driver position, inhibit propulsion of the vehicle, and activate the vehicle alarm system. When the theft flag and disablement of the telematics module 20 are detected, it is to be understood that the body control module 22 may activate any theft-detected state without departing from the spirit or scope of the present disclosure.

As FIG. 3 illustrates, the method 50 further comprises detecting enablement of the telematics module from one of the body control module and the backend server in box 60, and reactivating of at least one vehicle component or at least one theft-detected state (e.g., unlocking devices or enabling propulsion) in box 62. Alternatively, the method 50 may comprise in box 62 detecting enablement of the telematics module from one of the body control module and the backend server in box 60, and deactivating the at least one theft-detected state of the vehicle when enablement of the telematics module is detected in box 62.

For example, when the body control module 22 detects communication of the telematics module 20 is restored, the body control module 22 deactivates the theft-detected state(s) that had been activated. The body control module 22 then resets its monitor of the telematics module 20.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method of theft detection for a vehicle, the method comprising:
   providing a telematics module, a body control module and an engine control module disposed in the vehicle having components and at least one theft-detected state, the body control module being in communication with the telematics module and the engine control module;
   detecting at least one event by the body control module defining a theft flag;
   detecting disablement of the telematics module from the backend server; and
   activating the at least one theft-detected state of the vehicle when the theft flag and disablement of the telematics module from the backend server are detected.

2. The method of claim 1 wherein the at least one theft-detected states comprises inhibited propulsion of the vehicle, inhibited key learning in the body control module, inhibited transmission of the vehicle, initiated video recording of driver position, initiated vehicle slow down, initiated at least one vehicle component lockdown, initiated vehicle display.

3. The method of claim 1 wherein the step of detecting the at least one event by the body control module includes detecting one of a new key learned, a vehicle alarm trigger, loss of communication with the engine control module, and no key found when driving.

4. The method of claim 1 wherein the components include a navigation system, a stereo system, a heating system, an air conditioning system.

5. The method of claim 1 wherein the telematics module is in further communication with a backend server, the backend server being disposed remotely from the vehicle,
   wherein the step of detecting disablement of the telematics module is from one of the body control module and the backend server, and
   wherein the step of detecting disablement of the telematics module includes detecting loss of communication between the telematics module and one of the body control module and the backend server.

6. The method of claim 1 further comprising:
    detecting enablement of the telematics module from the one of the body control module and the backend server; and
    deactivating the at least one theft-detected state of the vehicle when enablement of the telematics module is detected.

7. A method of theft detection for a vehicle, the method comprising:
    providing a telematics module, a body control module and an engine control module disposed in the vehicle having components and at least one theft-detected state, the body control module being in communication with the telematics module and the engine control module, the telematics module being in further communication with a backend server, the backend server being disposed remotely from the vehicle;
    detecting at least one event by the body control module defining a theft flag;
    detecting loss of communication between the telematics module and the backend server; and
    activating the at least one theft-detected state of the vehicle when the theft flag and loss of communication between the telematics module and the backend server are detected.

8. The method of claim 7 wherein the at least one theft-detected states comprises inhibited propulsion of the vehicle, inhibited key learning in the body control module, inhibited transmission of the vehicle, initiated video recording of driver position, initiated vehicle slow down, initiated at least one vehicle component lockdown, initiated vehicle display.

9. The method of claim 7 wherein the step of detecting the at least one event by the body control module includes detecting one of a new key learned, a vehicle alarm trigger, loss of communication with the engine control module, and no key found when the vehicle is in operation.

10. The method of claim 7 wherein the components include a navigation system, a stereo system, a heating system, an air conditioning system.

11. The method of claim 7 wherein the step of detecting loss of communication between the telematics module and one of the body control module and the backend server includes loss of data transmission.

12. The method of claim 7 further comprising:
    detecting enablement of the telematics module from the one of the body control module and the backend server; and
    deactivating the at least one theft-detected state of the vehicle when enablement of the telematics module is detected.

13. A system of theft detection for a vehicle, the system comprising:
    an engine control module disposed in the vehicle for engine control;
    a telematics module disposed in the vehicle for transmittal of vehicle data;
    a body control module disposed in the vehicle having electronic components and at least one theft-detected state and in communication with the engine control module and the telematics module, the body control module being programmed to detect at least one event defining a theft flag and to detect disablement of the telematics module; and
    a backend server remotely located from the vehicle, the backend server being in communication with the telematics module and the body control module, the backend server being programmed to detect loss of communication between the telematics module and the backend server,
    wherein one of the body control module and the backend server is programmed to activate the at least one theft-detected state of the vehicle when the theft flag and loss of communication between the telematics module and the backend server are detected.

14. The system of claim 13 wherein the at least one theft-detected states comprises inhibited propulsion of the vehicle, inhibited key learning in the body control module, inhibited transmission of the vehicle, initiated video recording of driver position, initiated vehicle slow down, initiated at least one vehicle component lockdown, initiated vehicle display.

15. The system of claim 13 wherein the at least one event by the body control module includes detecting one of a new key learned, a vehicle alarm trigger, loss of communication with the engine control module, and no key found when driving.

16. The system of claim 13 the components include a navigation system, a stereo system, a heating system, an air conditioning system.

17. The system of claim 13 wherein disablement of the telematics module includes loss of communication between the telematics module and one of the body control module and the backend server.

18. The method of claim 13 further comprising:
    detecting enablement of the telematics module from the one of the body control module and the backend server; and
    deactivating the at least one theft-detected state of the vehicle when enablement of the telematics module is detected.

* * * * *